Patented Feb. 27, 1934

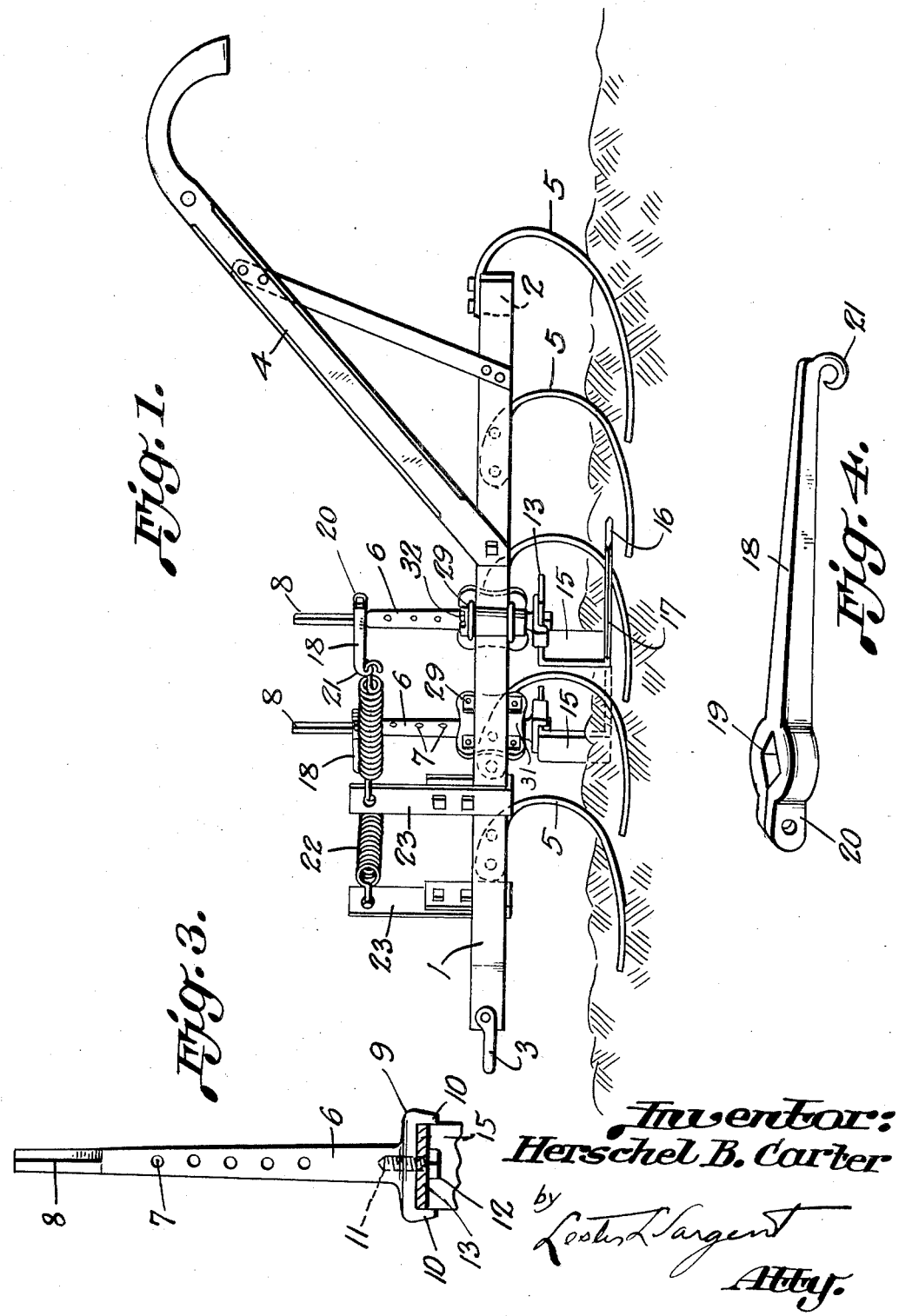

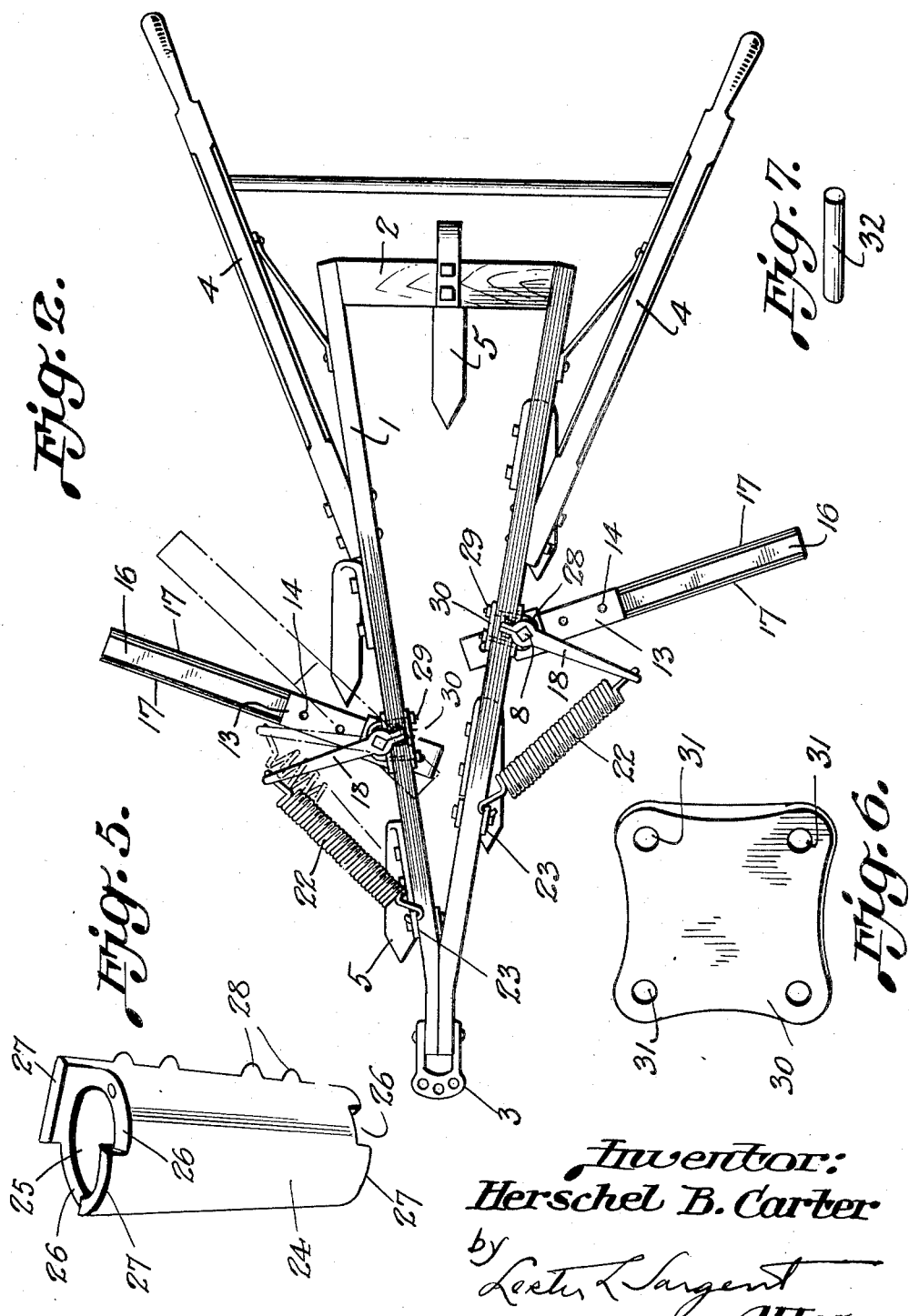

1,948,509

UNITED STATES PATENT OFFICE 1,948,509

BUSH AND WEED DESTROYING CULTIVATOR

Herschel B. Carter, Auburn, Ky.

Application December 17, 1932
Serial No. 647,818

2 Claims. (Cl. 97—179)

The object of my invention is to provide a novel weed cutter which may be attached to any type of cultivator and which is adjustable to or away from the rows to be weeded and which is also arranged to swing to one side when a heavy stone or other object which cannot be moved is encountered. I attain these and other objects of my invention by the device illustrated in the accompanying drawings, in which—

Figure 1 is a side elevation of my invention applied to a cultivator;

Fig. 2 is a top plan view of my invention applied to a cultivator;

Fig. 3 is an enlarged detail view of member 6;

Fig. 4 is an enlarged detail perspective view of member 18;

Fig. 5 is an enlarged detail perspective view of member 24;

Fig. 6 is a plan view of plate 30; and

Fig. 7 is a detail perspective view of pin 32.

Like numerals designate like parts in each of the several views.

Referring to the accompanying drawings, there is illustrated a cultivator having longitudinal beam members 1 and cross-beam 2 with the usual clevis 3, hand bars 4 and curved tines 5.

I provide posts 6 each having a series of spaced apertures 7 and a squared end 8. The post 6 has a base 9 with flanges 10 which engage over the upper horizontally disposed shank of weed cutter blade 13. Each of the posts 6 is provided with a threaded aperture 11 to receive the screw 12 which fastens it to member 13.

I provide a weed cutter blade 16 having opposite sharpened edges 17 and having a vertically disposed end portion 15 terminating in a horizontal shank 13 to which the post 6 is attached, as shown in Figs. 1 and 3. I provide an arm 18 as shown in Figs. 1 and 4 which has a squared opening 19 to seat over the squared end 8 of post 6. The arm 18 is provided with bifurcated ends 20 which may be bolted together to more tightly secure same on the squared end 8. The outer end of arm 18 is provided with an eye 21 which engages the end of a coil spring 22, the opposite end of the coil spring being attached to a vertical clamp bar 23 which is secured to the beam of the cultivator as shown in Figs. 1 and 2.

I provide a sleeve 24 in the channel 25 of which the lower end of the post 6 is mounted. This sleeve is provided with lateral ears 28 adapted to be engaged by the U-shaped clamps 29 by which the sleeve is rotatably secured on the cultivator frame. The ends of the U-shaped clamp bars 29 engage through the apertures 31 and are fastened by suitable bolts as shown in Figs. 1 and 2. Sleeve 24 is provided with opposite projections 27 and opposite recessed portions 26 at each end of the sleeve. The plate 30 is provided with apertures 31 in each corner as shown in Fig. 6 and the plate is of sufficient size to permit of securing the U-bars to the plate in the manner illustrated in Fig. 1.

In use, two weed cutter bars are placed on a cultivator, one on the right beam and one on the left beam and from twelve to twenty-four inches in advance of the shovels or tines. The device is adjustable and can be set to or away from a row of tobacco, cotton, corn, etc. It can be set to operate in or on top of the ground. The blade normally runs in the ground from one to three inches and will cut weeds, grass and small bushes. The cutter is held in place by a spring which allows the blade to turn straight back when it strikes some stationary object too hard to cut. The blades are sharpened on each edge so they can be used on either side. Therefore they have to be sharpened less often. In wet weather, if the ground is too wet to plow or cultivate, the shovels may be removed and the cutter only used. As will be apparent by referring to Fig. 2, one of the cutter blades 16 and the spring 22 is shown in full lines in its normal operating position and in dotted lines in the position it will assume when it encounters a stone or other obstacle too heavy to be moved causing the cutter blade to swing rearwardly and pass by the obstacle. The post 6 may be held in adjusted position by the insertion of pin 32 through one of the apertures 7.

In using this implement I have found that it is much more than a weeder. Besides destroying unwanted vegetation, it cultivates the ground in front of whatever tool to which it may be attached as well as any shallow running implement such as a small harrow. It can be used both as weeder and cultivator.

The blade 16, as shown in the drawings, is reversible, and can be worked on either side of the beam. These weeders are usually worked in pairs, and when one sharpened edge of the blade 16 becomes dulled, the bearing can be turned over and the blade turned around and the other edge of the blade cuts. The provision of the double edged blade, as illustrated, makes the blade reversible, prevents there being any "rights" or "lefts" to any part and gives double work to one sharpening, and gives double wear to the blade.

What I claim is:—

1. In a weed cutter of the type described, the combination of a cutter blade having a shank spaced above the blade, said shank having a vertical portion and a horizontal portion, a post secured to the horizontal portion of the shank, a sleeve in which the post is rotatably mounted, means for attaching the sleeve to a cultivator, an arm mounted on the upper end of the post, a spring attached to the free end of the arm, means affixed to the cultivator to which the other end of the spring is attached, whereby a rotative movement of the cutter blade is permitted against the tension of the spring when an obstacle is encountered, the post having a series of apertures for adjustably mounting same in the sleeve, and a pin insertable through the apertures for supporting the post in adjusted position on the upper edge of the sleeve.

2. In a weed cutter of the type described, the combination of a cutter blade having a shank spaced above the blade, a post secured to the shank, a sleeve in which the post is rotatably mounted, means for attaching the sleeve to a cultivator, an arm mounted on the upper end of the post, a spring attached to the free end of the arm, means affixed to the cultivator to which the other end of the spring is attached, whereby a rotative movement of the cutter blade is permitted against the tension of the spring when an obstacle is encountered, the post having a series of apertures for adjustably mounting same in the sleeve, and a pin insertable through the apertures for supporting the post in adjusted position on the upper edge of the sleeve, the aforesaid sleeve having opposite recessed upper edged portions to permit of a limited rotative movement of the blade, post and arm.

HERSCHEL B. CARTER.